US008899112B2

(12) United States Patent
Furuhata et al.

(10) Patent No.: US 8,899,112 B2
(45) Date of Patent: Dec. 2, 2014

(54) GYRO SENSOR AND ELECTRONIC DEVICE INCLUDING THE SAME

(71) Applicant: Seiko Epson Corporation, Tokyo (JP)

(72) Inventors: Makoto Furuhata, Matsumoto (JP); Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 71 days.

(21) Appl. No.: 13/849,089

(22) Filed: Mar. 22, 2013

(65) Prior Publication Data
US 2013/0255377 A1  Oct. 3, 2013

(30) Foreign Application Priority Data

Apr. 3, 2012  (JP) ................................ 2012-084617

(51) Int. Cl.
G01C 19/00 (2013.01)
G01C 19/5747 (2012.01)
G01C 19/5719 (2012.01)

(52) U.S. Cl.
CPC ........ G01C 19/5719 (2013.01); G01C 19/5747 (2013.01)
USPC ..................................................... 73/504.12

(58) Field of Classification Search
CPC ........................ G01C 19/5719; G01C 19/5747
USPC ...................... 73/503.3, 504.02, 510, 504.12
See application file for complete search history.

(56) References Cited

U.S. PATENT DOCUMENTS

| 5,023,462 | A | * | 6/1991 | Yamada et al. | ............ 250/492.2 |
| 5,503,018 | A | * | 4/1996 | Norling et al. | ............. 73/514.15 |
| 5,600,065 | A | * | 2/1997 | Kar et al. | .................... 73/504.12 |
| 5,895,850 | A |   | 4/1999 | Buestgens | |
| 6,250,156 | B1 | * | 6/2001 | Seshia et al. | ............... 73/504.12 |
| 6,360,605 | B1 | * | 3/2002 | Pinter et al. | ................ 73/514.38 |
| 6,694,814 | B2 |   | 2/2004 | Ishio | |
| 6,705,164 | B2 |   | 3/2004 | Willig et al. | |
| 6,876,093 | B2 | * | 4/2005 | Goto et al. | ..................... 257/798 |
| 6,928,872 | B2 |   | 8/2005 | Durante et al. | |
| 7,461,552 | B2 | * | 12/2008 | Acar | ........................... 73/504.04 |
| 7,513,155 | B2 | * | 4/2009 | Jeong et al. | ................ 73/504.02 |
| 7,518,493 | B2 | * | 4/2009 | Bryzek et al. | ................. 340/442 |

(Continued)

FOREIGN PATENT DOCUMENTS

| JP | 2002228680 A | 8/2002 |
| JP | 3512004 B | 3/2004 |

(Continued)

Primary Examiner — Peter Macchiarolo
Assistant Examiner — Samir M Shah
(74) Attorney, Agent, or Firm — Harness, Dickey & Pierce, P.L.C.

(57) ABSTRACT

A gyro sensor includes: a driving mass; a detection mass connected with the driving mass; a driving connection one end and the other end of which are connected with the driving mass and an anchor, respectively; an island connected with the anchor, and disposed with a clearance left between the island and the driving mass in such a manner as to be electrically connected with the driving mass; and a projection provided at least either on the surface of the driving mass opposed to the island, or on the surface of the island opposed to the driving mass. The driving unit includes a movable electrode unit connected with the driving mass, and a fixed electrode unit. The minimum distance between the driving mass and the island is longer than the driving amplitude of the driving mass and shorter than the maximum amplitude of the movable electrode unit.

8 Claims, 6 Drawing Sheets

(56) References Cited

U.S. PATENT DOCUMENTS

| | | | |
|---|---|---|---|
| 7,677,099 B2* | 3/2010 | Nasiri et al. | 73/504.12 |
| 8,021,917 B2* | 9/2011 | Akimoto et al. | 438/104 |
| 8,256,290 B2* | 9/2012 | Mao | 73/504.12 |
| 8,319,216 B2* | 11/2012 | Akimoto et al. | 257/43 |
| 8,377,799 B2* | 2/2013 | Yamazaki et al. | 438/458 |
| 8,440,502 B2* | 5/2013 | Akimoto et al. | 438/104 |
| 2003/0164040 A1* | 9/2003 | Willig et al. | 73/504.02 |
| 2007/0125161 A1* | 6/2007 | Bryzek et al. | 73/146.4 |
| 2007/0234803 A1 | 10/2007 | Gomez et al. | |
| 2009/0100930 A1 | 4/2009 | Coronato et al. | |
| 2009/0114016 A1* | 5/2009 | Nasiri et al. | 73/504.12 |
| 2009/0315644 A1* | 12/2009 | Sheedy et al. | 333/186 |
| 2010/0117076 A1* | 5/2010 | Akimoto et al. | 257/43 |
| 2010/0117086 A1* | 5/2010 | Akimoto et al. | 257/57 |
| 2010/0126269 A1* | 5/2010 | Coronato et al. | 73/504.04 |
| 2010/0126272 A1* | 5/2010 | Coronato et al. | 73/504.14 |
| 2010/0132463 A1* | 6/2010 | Caminada et al. | 73/504.12 |
| 2011/0030473 A1* | 2/2011 | Acar | 73/504.12 |
| 2011/0061460 A1* | 3/2011 | Seeger et al. | 73/504.12 |
| 2011/0244652 A1* | 10/2011 | Yamazaki et al. | 438/458 |
| 2011/0318916 A1* | 12/2011 | Akimoto et al. | 438/591 |
| 2012/0060604 A1* | 3/2012 | Neul et al. | 73/504.12 |
| 2012/0116707 A1* | 5/2012 | Malvern | 702/104 |

FOREIGN PATENT DOCUMENTS

| | | |
|---|---|---|
| JP | 4047377 B2 | 2/2008 |
| JP | 4277025 B2 | 6/2009 |
| WO | WO-9529383 A1 | 11/1995 |
| WO | WO-2005045368 A1 | 5/2005 |

* cited by examiner

GYRO SENSOR AND ELECTRONIC DEVICE INCLUDING THE SAME

BACKGROUND

1. Technical Field

The present invention relates to a gyro sensor and an electronic device including this gyro sensor, and more particularly to a gyro sensor capable of preventing damage to and adhesion of a drive system of the gyro sensor and to an electronic device including this gyro sensor.

2. Related Art

As known in the art, a gyro sensor is equipped on electronic devices such as digital cameras, video cameras, cellular phones, and automotive navigation systems to detect an angular velocity of the devices for position control or the like. An MEMS (micro electro mechanical system) capacitance gyro sensor includes a driving system and a detecting system, and determines an angular velocity based on a Coriolis force generated in the detecting system when an angular velocity is applied to the driving system oscillating at a constant oscillation frequency and to the detecting system interlocked with the driving system, regarding this force as a change of the capacitances of the detecting system (movable electrode) and a fixed electrode. According to this structure, the driving system is often disposed in such a position as to surround the outside of the detecting system. Also, there are often provided two units arranged side by side each including the driving system and the detecting system so as to cancel the acceleration components and detect only the angular velocity. In this case, the two driving systems are driven in the opposite phases and oscillate in the opposite directions. Therefore, when a physical amount such as an excessive voltage is applied to the driving electrode of the gyro sensor or when the gyro sensor drops, collision between the driving system and the element disposed outside or between the two driving systems may occur, producing risk of damage to the gyro sensor. Moreover, particularly in the case of a gyro sensor including silicon, charges generated on the surfaces of the electrodes are attracted to each other, in which condition the electrodes adhere to each other and are difficult to be separated therefrom in some cases.

There is disclosed in JP-A-2002-228680, a capacitance mechanical sensor provided with a movable electrode which shifts in accordance with a physical amount, and a fixed electrode which faces to the movable electrode with a small clearance left therebetween. According to this sensor, a projection is formed on at least one of the movable electrode and the fixed electrode to produce a height difference from the one electrode provided with the projection to the other electrode, so that adherence between the movable electrode and the fixed electrode can decrease. This projection is provided for the purpose of preventing adhesion between the electrodes or between a fixed portion and a weight portion.

According to the capacitance mechanical sensor disclosed in JP-A-2002-228680, however, it is required to increase the distance between the electrodes by the length corresponding to the projection disposed on the side of the fixed electrode opposed to the movable electrode. In this case, size reduction of the elements becomes difficult.

SUMMARY

An advantage of some aspects of the invention is to provide a gyro sensor capable of preventing adhesion of elements caused by collision, and to provide an electronic device including this gyro sensor. Another advantage of some aspects of the invention is to provide a gyro sensor capable of avoiding contact between a fixed electrode and a movable electrode caused by shock without the necessity for forming a projection between the fixed electrode and the movable electrode, and to provide an electronic device including this gyro sensor. A further advantage of some aspects of the invention is to provide a gyro sensor capable of preventing damage to the elements caused by collision, and to provide an electronic device including this gyro sensor.

The invention can be implemented as the following modes or application examples.

APPLICATION EXAMPLE 1

This application example of the invention is directed to a gyro sensor which includes: a driving mass driven in a first direction by a driving unit; a detection mass connected with the driving mass; a driving connection one end and the other end of which are connected with the driving mass and a first anchor, respectively; a first island connected with the first anchor, and disposed with a clearance left between the first island and the driving mass in such a manner as to be electrically connected with the driving mass; and a projection provided at least either on the surface of the driving mass opposed to the first island, or on the surface of the first island opposed to the driving mass. The driving unit includes a movable electrode unit connected with the driving mass, and a fixed electrode unit disposed opposed to the movable electrode unit. The minimum distance between the driving mass and the first island is longer than the driving amplitude of the driving mass and shorter than the maximum amplitude of the movable electrode unit.

According to this application example of the invention, damage to the driving mass can be avoided by forming the projection which collides with the driving mass and reduces shock caused when the driving mass greatly oscillates. Moreover, the contact area at the collision with the projection is small, and the driving mass, the projection, and the first island are electrically connected with each other to have the same potential, in which condition adhesion between the projection and the first island or the driving mass does not occur. Furthermore, the driving mass can be oscillated with the designed driving amplitude, while avoiding contact between the fixed electrode unit and the movable electrode unit without the necessity for forming a projection between the fixed electrode unit and the movable electrode unit.

APPLICATION EXAMPLE 2

This application example of the invention is directed to the gyro sensor according to the application example 1, wherein the first island has a first distance regulating portion extended to a position facing to the driving mass to regulate the distance between the driving mass and the first island; and the projection is provided at least either on the surface of the driving mass opposed to the first distance regulating portion, or on the surface of the first distance regulating portion opposed to the driving mass.

According to this application example of the invention, the distance between the provided projection and the element (projection, driving mass, or first distance regulating portion) opposed to the provided projection can be controlled by the first distance regulating portion.

APPLICATION EXAMPLE 3

This application example of the invention is directed to the gyro sensor according to the application example 1 or 2, wherein the two driving masses are arranged in the first direction; and the gyro sensor further includes an intermediate connection which connects the two driving masses, the intermediate portion of the intermediate connection being fixed via a second anchor, a second island disposed between the two driving masses and connected with the second anchor, and projections provided at least either on the surfaces of the driving masses opposed to the second island or on the surfaces of the second island opposed to the driving masses.

According to this application example of the invention, there are provided the two driving masses, and the second island and the projections are disposed between the two driving masses. In this case, the projections can reduce shock caused when the respective driving masses greatly oscillate in the direction approaching each other. Thus, damage to the driving masses can be avoided.

APPLICATION EXAMPLE 4

This application example of the invention is directed to the gyro sensor according to the application example 3, wherein the second island has a second distance regulating portion extended to positions facing to the respective driving masses to regulate the distances between the driving masses and the second island; and the projections are provided at least either on the surfaces of the driving masses opposed to the second distance regulating portion, or on the surfaces of the second distance regulating portion opposed to the driving masses.

According to this application example of the invention, the distance between the provided projection and the element (projection, driving mass, or second distance regulating portion) opposed to the provided projection can be controlled by the second distance regulating portion.

APPLICATION EXAMPLE 5

This application example of the invention is directed to the gyro sensor according to any of the application examples 1 through 4, wherein at least a pair of the first islands are arranged in a direction crossing the first direction.

According to this application example of the invention, at least a pair of the first islands and the driving mass have the same potential and repulsively move from each other. Accordingly, distortion produced in the oscillation of the driving mass, if any, can be corrected.

APPLICATION EXAMPLE 6

This application example of the invention is directed to the gyro sensor according to any of the application examples 1 through 5, wherein the detection mass is connected with the driving mass via a detection connection; and a projection is provided at least either on the detection mass or on the detection connection.

According to this application example of the invention, the contact area of the projection produced when the driving mass and the detection mass shift in the direction approaching each other is small. Thus, adhesion between the driving mass and the detection mass can be avoided.

APPLICATION EXAMPLE 7

This application example of the invention is directed to the gyro sensor according to any of the application examples 1 through 6, wherein: the anchor is fixed to a substrate; and a projection is provided on the substrate at a position overlapping at least either with the driving mass or with the detection mass in the plan view.

According to this application example of the invention, adhesion of the driving mass or the detection mass to the substrate can be prevented when the driving mass and the detection mass shift in the direction of approaching the substrate.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention is hereinafter described with reference to the drawings.

Figure 1:
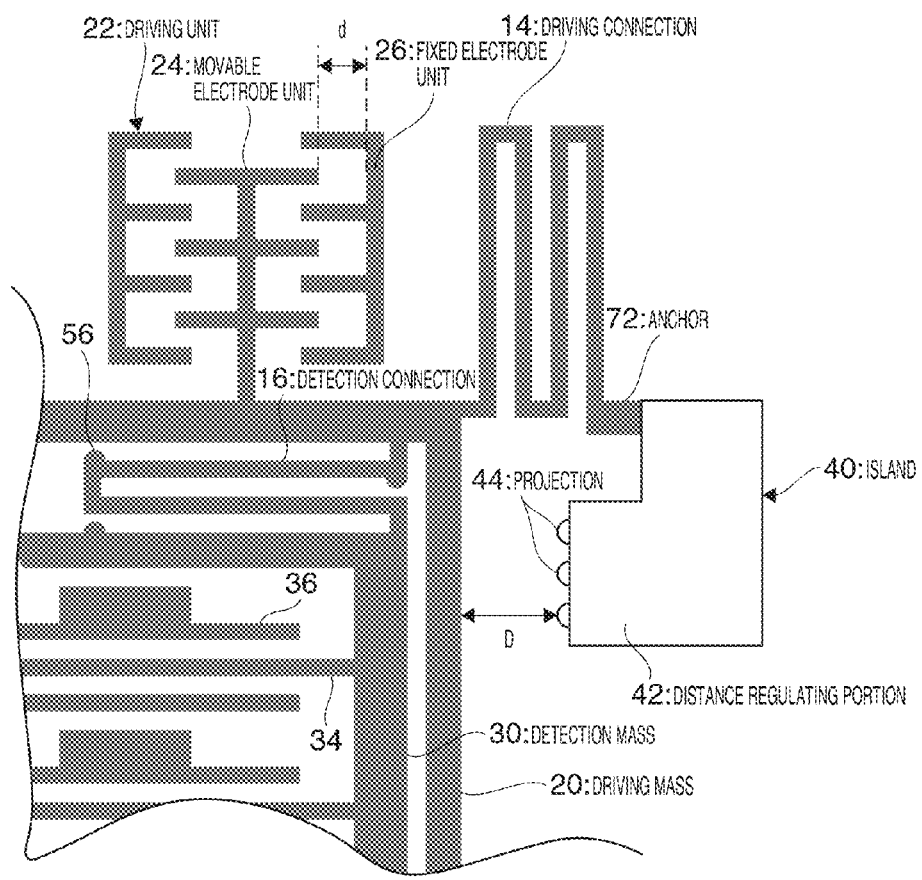
FIG. 1 is a plan view schematically illustrating the main part of a gyro sensor according to an embodiment of the invention.
Figure 2:
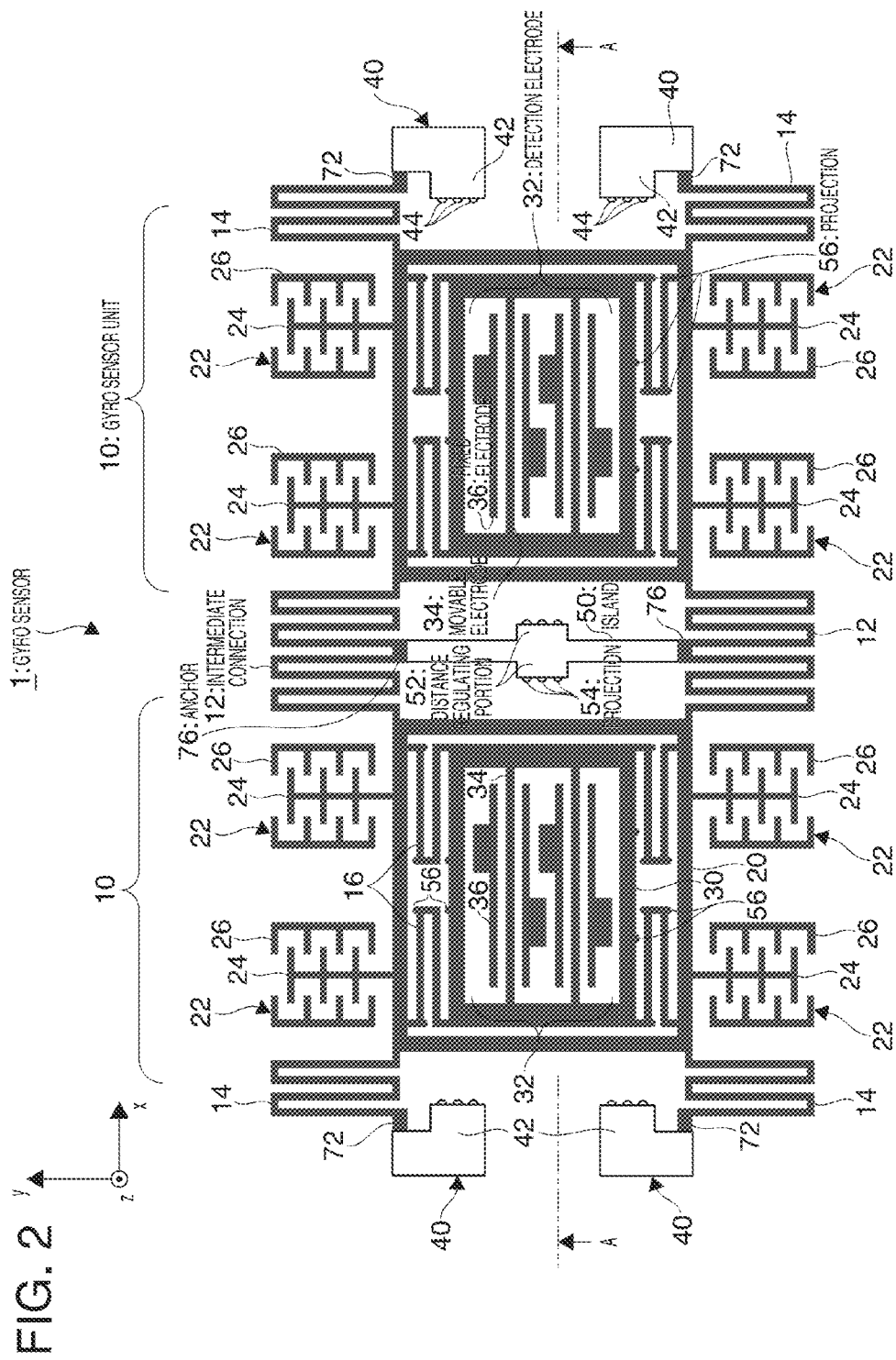
FIG. 2 is a plan view schematically illustrating the gyro sensor according to this embodiment.
Figure 3:
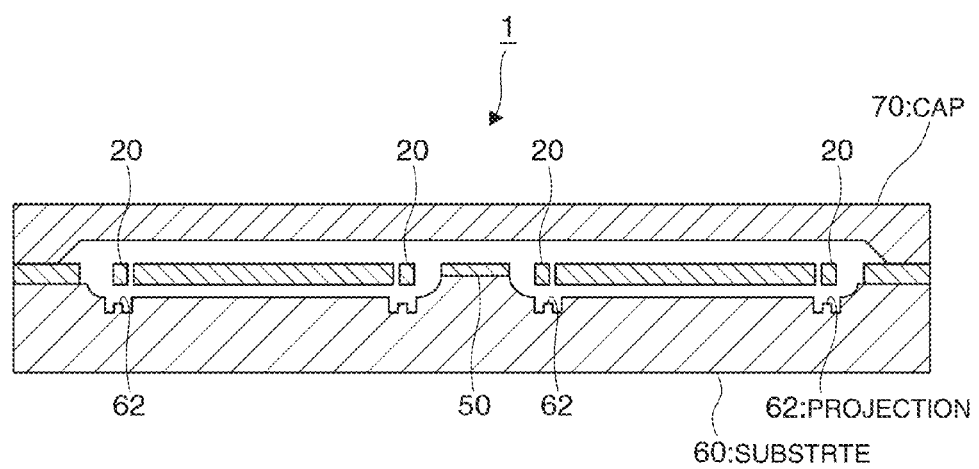
FIG. 3 is a cross-sectional view of a gyro sensor 1 shown in FIG. 2, taken along a line A-A in FIG. 2.

FIG. 1 is a partial plan view schematically illustrating the main part of a gyro sensor 1. FIG. 2 is a plan view schematically illustrating the gyro sensor 1 according to the embodiment of the invention. FIG. 3 is a cross-sectional view of the gyro sensor 1 shown in FIG. 2, taken along a line A-A in FIG. 2.

As illustrated in these figures, the gyro sensor 1 includes a substrate 60 on which two gyro sensor units 10 are arranged in the direction of an x axis, assuming that the plate surface of the substrate 60 corresponds to an x-y plane in the rectangular coordinates (see FIG. 2), with a clearance left between the substrate 60 and the gyro sensor units 10. The two gyro sensor units 10 are covered by a cap 70 for closure of the units 10.

The substrate 60 is made of glass, for example. On the other hand, each of the gyro sensor units 10 is made of silicon, for example, and has an overall external appearance formed by etching.

Main constituents constituting each of the two gyro sensor units 10, as will be described below, are disposed linearly symmetric with respect to the Y axis.

For each of the gyro sensor units 10, a frame-shaped driving mass 20 is equipped at the center of the unit 10. A frame-shaped detection mass 30 is disposed inside the driving mass 20 and connected therewith. The detection mass 30 may be positioned outside the driving mass 20 instead of inside the driving mass 20. Besides, the shapes of the driving mass 20 and the detection mass 30 are not limited to the frame shapes but may be other shapes as long as they form mass bodies. For example, the driving mass 20 and the detection mass 30 may be U-shaped.

Each of the pair of the driving masses 20 is supported at its four corners on the substrate 60 via intermediate connections 12 and driving connections 14 in such a manner as to make planar movement in parallel with the upper surface of the substrate 60. The expanding and contracting directions of the respective connections 12 and 14 are so designed as to allow reciprocating oscillation of the driving masses 20 particularly in the direction of their arrangement direction (x axis direction, corresponding to a "first direction"). The opposed two corners of the two driving masses 20 are connected via the intermediate connection 12 in such a manner as to generate elastic forces in the direction of moving close to and away from each other (x axis direction). Each of the intermediate connections 12 is supported on the substrate 60 via an anchor (corresponding to a "second anchor") 76 provided in the middle portion of the intermediate connection 12. The two corners of each of the driving masses 20 on the side opposite to the opposed sides of the respective driving masses 20 are connected with the driving connections 14. Each of the driving connections 14 operates in a manner similar to the operation of the intermediate connections 12 with the fixing support point between the driving connection 14 and the substrate 60 located at an anchor (corresponding to a "first anchor") 72, and elastically supports the driving mass 20 in such a condition as to allow shift of the driving mass 20 in the direction of the x axis. The spring constants of the respective connections 12 and 14 disposed at the four corners of the respective driving masses 20 are equalized. The driving masses 20 are allowed to make independent planar oscillation in the direction of the x axis.

Moreover, each of the driving masses 20 is provided with two driving units 22 connected to each of the two sides of the corresponding driving mass 20 crossing the side thereof opposed to the side of the other driving mass 20 at right angles. The driving mass 20 is driven by the driving units 22 to oscillate in the direction of the x axis. Each of the driving units 22 includes a movable electrode unit 24 connected to the driving mass 20, and a fixed electrode unit 26 disposed opposed to the corresponding movable electrode unit 24 and fixed to the substrate 60. Each of the movable electrode unit 24 and the fixed electrode unit 26 has a comb-like electrode fingers. The electrode fingers of the movable electrode unit 24 and the fixed electrode unit 26 are alternately disposed with constant clearances therebetween.

When alternating voltage is applied to the driving units 22, the movable electrode unit 24 oscillates in the direction of the x axis by electrostatic attraction generated between the movable electrode unit 24 and the fixed electrode unit 26. As a result, the driving mass 20 connected with the corresponding movable electrode unit 24 similarly oscillates in the direction of the x axis. The two driving masses 20 oscillate in the opposite directions by applying alternating voltages in the opposite phases to the driving units 22 of the two gyro sensor units 10.

The two sides of each of the driving masses 20 extending in the direction of the x axis are connected with the two sides of the corresponding detection mass 30 extending in the direction of the x axis via two detection connections 16 capable of expanding and contracting in the direction of the y axis. This structure allows the detection mass 30 interlocked with the driving mass 20 to oscillate in the direction of the x axis. When an angular velocity around the z axis is applied to the two detection masses 30 with the two driving masses 20 oscillating in the opposite directions along the x axis, the two detection masses 30 receive Coriolis forces and thus oscillate in the opposite directions along the y axis.

Each of the detection masses 30 contains a detection electrode 32. The detection electrode 32 has a plurality of (two in this embodiment) movable electrodes 34 provided on the detection mass 30 and arranged in the shape of lateral crosspieces, and fixed electrodes 36 fixed to the substrate 60 and disposed in parallel with each other in such a manner that the movable electrodes 34 can be sandwiched between the fixed electrodes 36.

When the detection mass 30 rotates around the Z axis, the distance between the movable electrodes 34 connected to the detection mass 30 and the fixed electrodes 36 changes, thereby producing a change of the capacitance. The angular velocity around the Z axis is determined based on this change of the capacitance.

As illustrated in FIGS. 1 and 2, each of the driving connections 14 connected with the outside corners of the driving mass 20 is formed by a plurality of spring pieces arranged in the direction of the y axis and connected in a zigzag line in such a manner as to expand and contract in the direction of the x axis. The driving connection 14 is connected such that one end thereof is joined with the driving mass 20, while the other end is joined with an island (corresponding to a "first island") 40 via the anchor 72. The island 40 is formed integrally with the anchor 72. The bottom surface of the island 40 is fixed to the substrate 60. The island 40 is a rectangular flat plate leveled with the plane of the driving mass 20, the detection mass 30, or the driving connection 14. The island 40, the anchor 72, the driving mass 20, and the driving connection 14 are electrically connected to one another, and thus electrically have the same potential. In this embodiment, the anchor 72 and the island 40 are given different reference numbers. However, in the structure where the anchor 72 and the island 40 are formed integrally with each other and fixed to the substrate 60 as noted above, the function of the anchor is provided both by the anchor 72 and the island 40.

The islands 40 are provided on each of the pair of the driving masses 20 with clearances left between the islands 40 and the driving mass 20. According to this embodiment, the islands 40 are disposed opposed to the outer periphery of each of the driving masses 20 in the oscillation direction, and positioned adjacent to a pair of the upper and lower corners of the driving mass 20 as illustrated in FIG. 2. Accordingly, a pair of the islands 40 are provided with the y axis center line interposed therebetween, and another pair of the islands are provided with the x axis center line interposed therebetween, that is, there are formed the four islands 40 in total. The islands 40 of each pair are symmetrically disposed. Each of the islands 40 has a distance regulating portion (corresponding to a "first distance regulating portion") 42 which is a part of the flat plate of the island 40 opposed to the driving mass 20 and expanded toward the driving mass 20 to regulate the separation distance between the island 40 and the driving mass 20 in the oscillation direction. The distance regulating portion 42 forms a rectangular area, and the edge of the expanded portion of the distance regulating portion 42 extends in parallel with the outside periphery of the driving mass 20. A plurality of projections 44 are provided on the surface of the distance regulating portion 42 opposed to the driving mass 20. The heights of the respective projections 44 are not required to be uniform. The number of the projections 44 provided on the surface may be single rather than plural.

According to this structure, the projections 44 thus provided collide with the driving mass 20 by a small contact area when the driving mass 20 greatly shifts in the direction of the x axis by an excessively large physical amount applied thereto or shock given from the outside. Accordingly, excessive displacement of the driving mass 20 does not occur, causing no damage to the driving mass 20. The island 40 and the driving mass 20 are connected with the driving connection 14 and the anchor 72, and therefore have the same potential on the whole. In this case, the island 40 and the driving mass 20 are not attracted to each other but only come into contact with each other. This structure thus prevents sticking between the island 40 and the driving mass 20.

Moreover, a pair of the islands 40 are provided in the direction of the y axis in such positions as to be opposed to the driving mass 20. The two islands 40 and the driving mass 20 have the same potential. According to this structure, distortion produced by a component included in the oscillation of the driving mass 20 and oscillating in the direction of the y axis, if any, can be corrected. The number of the islands 40 is not limited to one pair but may be three or more.

As illustrated in FIG. 1, it is preferable that a distance D between the projections 44 and the driving mass 20 is controlled by the distance regulating portion 42 in such a manner as to have a length larger than the driving amplitude of the driving mass 20 established beforehand at the time of design, and smaller than a maximum amplitude d in the possible oscillation range of the movable electrode unit 24 regulated by the fixed electrode unit 26 of the driving unit 22 and oscillating in the direction of the x axis from the neutral position.

This structure can prevent the problem that the driving mass 20 contacting the projections 44 is unable to oscillate with a driving amplitude designed beforehand. Moreover, since the driving mass 20 contacts the projections 44 before contact between the movable electrode unit 24 of the driving unit 22 and the fixed electrode unit 26, damage caused by collision between the movable electrode unit 24 and the fixed electrode unit 26 can be avoided in the event of application of an excessive voltage or for other reasons.

The projections 44 may be provided on the driving mass 20 opposed to the distance regulating portion 42 as well as on the distance regulating portion 42, or may be provided only on the driving mass 20. When the projections 44 are formed on the driving mass 20 opposed to the distance regulating portion 42 as well as on the distance regulating portion 42, the distance D corresponds to the distance between the projections 44 on the driving mass 20 and the projections 44 on the distance regulating portion 42. When the projections 44 are formed only on the driving mass 20, the distance D corresponds to the projections 44 disposed on the driving mass 20 and the surface of the distance regulating portion 42 opposed to the driving mass 20.

In other words, when the projections 44 are provided at least on either the surface of the driving mass 20 opposed to the island 40 or on the surface of the island 40 opposed to the driving mass 20, the distance D corresponds to the minimum distance between the driving mass 20 and the island 40, that is, the remaining length of the distance between the surface of the driving mass 20 opposed to the distance regulating portion 42 of the island 40 and the surface of the distance regulating portion 42 opposed to the driving mass 20, after subtraction of the height of the provided projections 44 (length in the direction of the x axis in the figure) from the distance.

As illustrated in FIG. 2, an island (corresponding to a "second island") 50 extending in the direction of the y axis is provided between the two driving masses 20. The island 50 is formed integrally with the anchors 76, and the bottom surface of the island 50 is fixed to the substrate 60. The island 50 has distance regulating portions (corresponding to a "second distance regulating portion") 52 disposed opposed to the two driving masses 20 to regulate the respective distances between the island 50 and the opposed driving masses 20.

Each of the distance regulating portions 52 is expanded in a rectangular shape toward the driving masses 20 positioned on both sides, and the edge of the distance regulating portion 52 on the expanded side is formed in parallel with the inner periphery of the driving mass 20. A plurality of projections 54 are provided on the surface of the distance regulating portion 52 opposed to the driving mass 20. The island 50 is electrically connected with the anchors 76, the intermediate connections 12, the distance regulating portions 52, and the driving masses 20, and thus electrically has the same potential as the potentials of these components. In this embodiment, the anchor 76 and the island 50 are given different reference numbers. However, in the structure where the anchor 76 and the island 50 are formed integrally with each other and fixed to the substrate 60 as noted above, the function of the anchor is provided both by the anchor 76 and the island 50.

The projections 54 prevent collision between the driving masses 20 when the driving masses 20 oscillate in the direction of approaching each other. This collision between the projections 54 and the driving masses 20 decreases excessive displacement, while avoiding adhesion between the projections 54 and the driving masses 20 by the considerably small contact area therebetween. Advantages similar to those referred to above can be offered when the distance between the projections 54 and the surface of the driving mass 20 opposed to the projections 54 is set longer than the preset driving amplitude of the driving mass 20 and shorter than the maximum amplitude d of the movable electrode unit 24 similarly to the distance between the projections 44 and the surface of the driving mass 20 opposed to the projections 44. Moreover, advantages similar to those produced when the two islands 40 are provided opposed to the driving mass 20 as referred to above can be offered when the two or more distance regulating portions 52 provided with the projections 54 are formed opposed to the driving mass 20.

The projections 54 may be provided on the surface of the driving mass 20 opposed to the distance regulating portion 52 as well as on the distance regulating portion 52, or may be provided only on the driving mass 20.

Projections 56 are further provided on the outside surfaces of the detection mass 30 on the sides extending in the direction of the x axis, and on the folded portions of the detection connections 16 connecting the driving mass 20 and the detection mass 30. The projections 56 contribute to prevention of damage by reducing excessive displacement caused when the driving mass 20 and the detection mass 30 greatly shift in the direction of the y axis. In addition, adhesion is avoided by reducing the contact area produced at the time of collision with the projections 56 and equalizing the potential at the contact positions. The projections 56 may be provided on the inner side surface of the detection mass 30 extending in the direction of the x axis, or may be provided on the inner side surface or outer side surface of the driving mass 20 in the direction of the x axis. Alternatively, the projections 56 may be formed only on the detection connection 16 or only on the detection mass 30.

As illustrated in FIG. 3, projections 62 are provided on the substrate 60 at positions overlapping with the driving mass 20 in the plan view. The projections 62 can be formed simultaneously with etching of the external shapes of the anchors 72 and 76 and others on the substrate 60. The projections 62 reduce excessive displacement and damage by collision between the projections 62 and the driving mass 20 when the driving mass 20 greatly shifts in the direction of the z axis. Moreover, the contact portions are not attracted to each other due to the decreased contact area at the time of collision, in which condition adhesion does not occur. The projections 62 may be provided on the substrate 60 at the positions overlapping with the detection mass 30 in the plan view as well as on the substrate 60 at the positions overlapping with the driving mass 20 in the plan view, or may be provided only on the substrate 60 at the positions overlapping with the detection mass 30 in the plan view.

Accordingly, when the driving mass 20 greatly shifts and collides with the projections 44, 54, 56, and 62 by shock such as an application of excessive physical amount and drop, this shock decreases by the presence of the projections 44, 54, 56, and 62. Thus, damage to the driving mass 20 is prevented. Moreover, the driving mass 20 is not attracted to the projections 44, 54, 56, and 62 by reduction of the contact area between the driving mass 20 and the projections 44, 54, 56, and 62 at the time of collision therebetween. Therefore, adhesion between the contact portions is avoided.

Furthermore, the distance between the driving mass 20 and the projections 44 and 54 is controlled by adjustment of the length in the direction of the x axis using the distance regulating portions 42 and 52. According to this structure, the driving amplitude of the driving mass 20 designed beforehand can be securely maintained, and the movable electrode unit 24 can be designed to avoid collision with the fixed electrode unit 26 without the necessity for forming projections between the fixed electrode unit 26 and the movable electrode unit 24 of the driving unit 22.

According to this embodiment, there are provided the two gyro sensor units 10 on the gyro sensor 1. However, only the one gyro sensor unit 10 may be equipped on the gyro sensor 1.

An electronic device according to an embodiment of the invention is hereinafter described.

Figure 4:
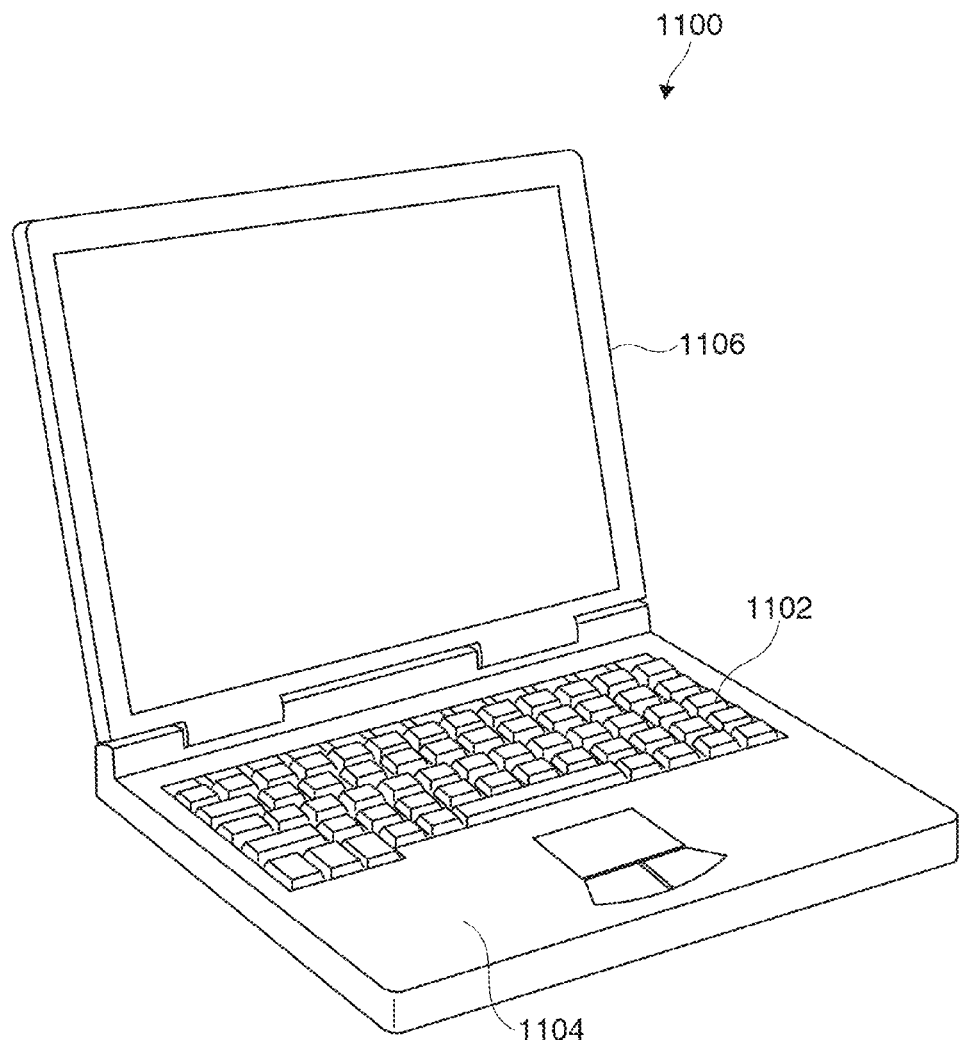
FIG. 4 is a perspective view illustrating the structure of a portable (notebook) personal computer incorporating an electronic device according to an embodiment of the invention.

FIG. 4 is a perspective view illustrating the structure of a portable (or notebook) personal computer incorporating the electronic device according to the embodiment of the invention.

As can be seen from the figure, a personal computer 1100 includes a main body 1104 provided with a keyboard 1102, and a display unit 1106. The display unit 1106 is supported via a hinge structure in such a manner as to be rotatable with respect to the main body 1104.

The personal computer 1100 having this structure contains the gyro sensor 1.

Figure 5:
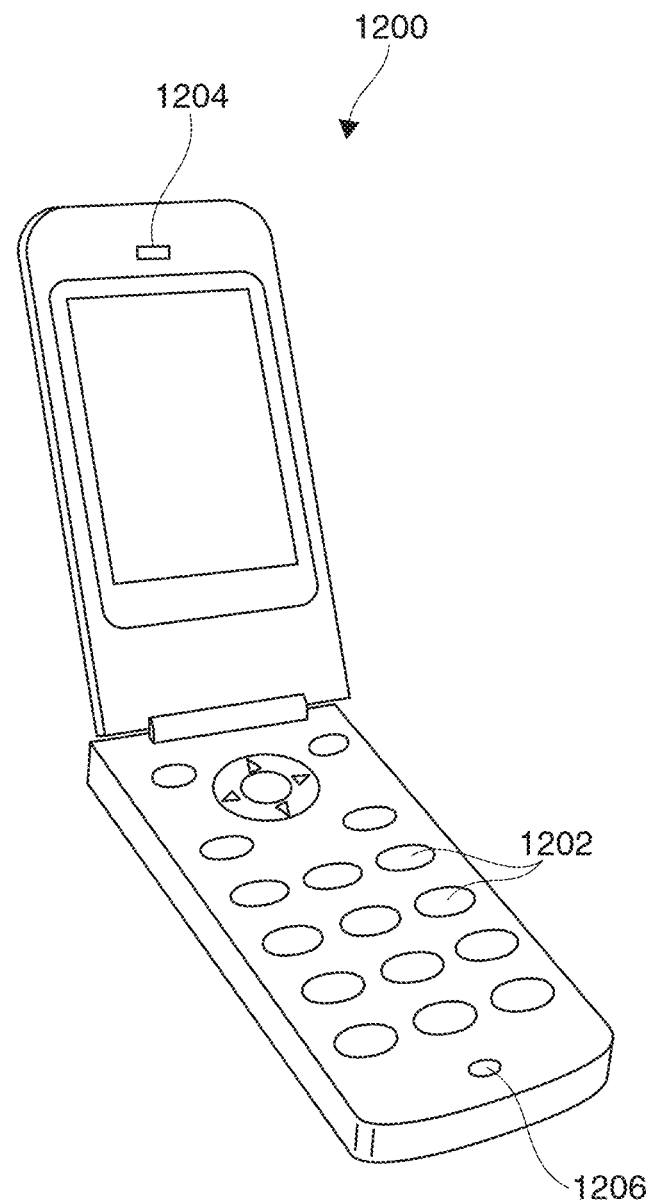
FIG. 5 is a perspective view illustrating the structure of a cellular phone (including PHS) incorporating the electronic device according to the embodiment of the invention.

FIG. 5 is a perspective view illustrating the structure of a cellular phone (including PHS) incorporating the electronic device according to the embodiment of the invention.

As illustrated in this figure, a cellular phone 1200 includes an antenna (not shown), a plurality of operation buttons 1202, a receiver 1204, and a transmitter 1206. A display unit is disposed between the operation buttons 1202 and the receiver 1204.

The cellular phone 1200 having this structure contains the gyro sensor 1.

Figure 6:
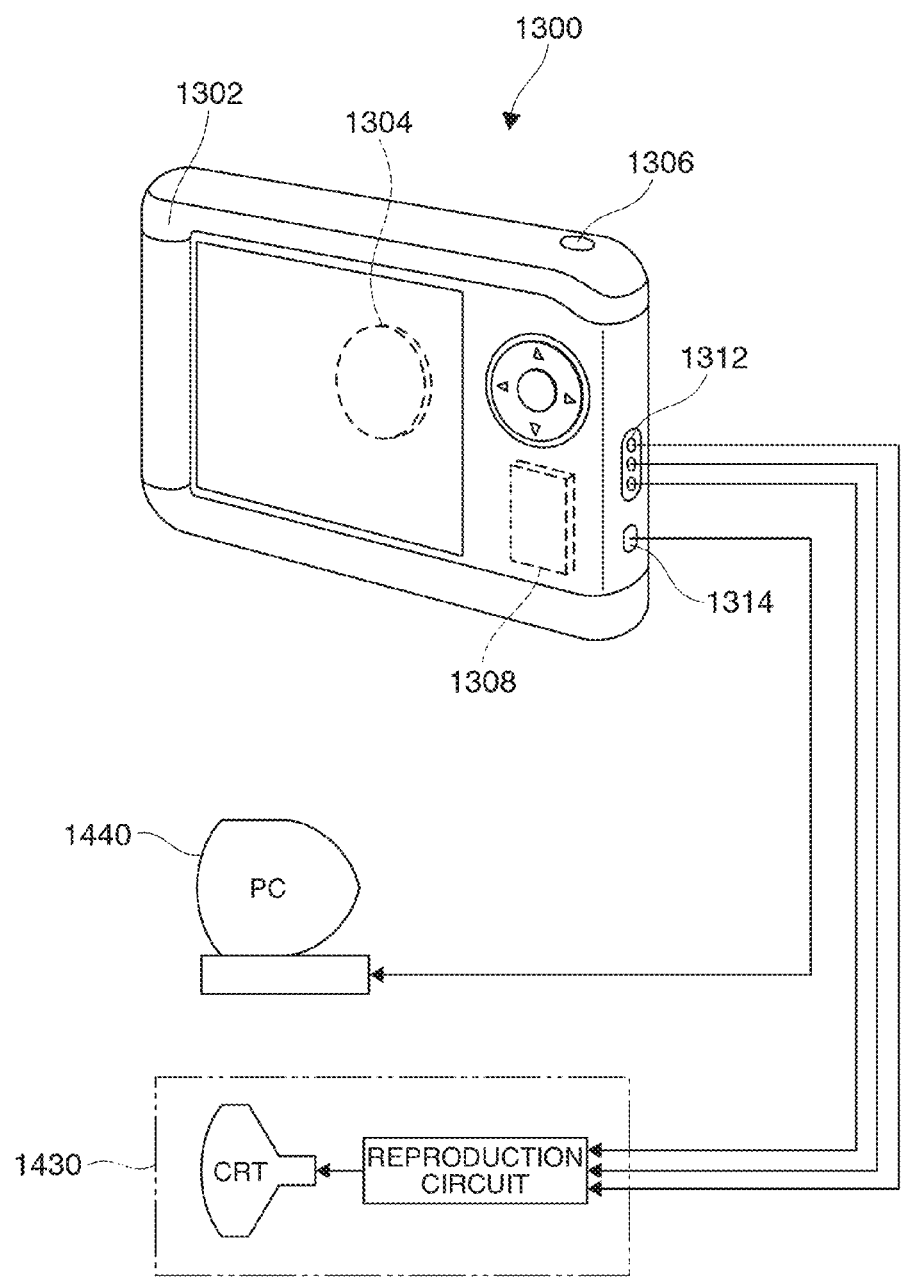
FIG. 6 is a perspective view illustrating the structure of a digital still camera incorporating the electronic device according to the embodiment of the invention.

FIG. 6 illustrates the structure of a digital still camera incorporating the electronic device according to the embodiment of the invention. This figure schematically shows a connection with an external device as well.

While an ordinary camera causes exposure of a silver halide photo film by receiving a light image of a subject, a digital still camera 1300 carries out photo-electric transformation of a light image of a subject by using an imaging element such as a CCD (charge coupled device) and produces an imaging signal (image signal).

A display unit is provided on the back surface of a case (body) 1302 of the digital still camera 1300 for display in accordance with the imaging signal produced by the CCD. The display has the function of a viewfinder which displays the subject as an electronic image.

A light receiving unit 1304 including an optical lens (imaging system), the CCD and other components is further provided on the front side (rear surface side of the figure) of the case 1302.

When a person taking an image identifies an image of the subject displayed on the display unit and presses down a shutter button 1306, an imaging signal generated by the CCD at that time is transmitted to and stored in a memory 1308.

According to the digital still camera 1300, there are provided a video signal output terminal 1312 and a data communication input/output terminal 1314 disposed on the side surface of the case 1302. As illustrated in the figure, a TV monitor 1430 connects with the video signal output terminal 1312, and a personal computer 1440 connects with the data communication input/output terminal 1314, when these connections are necessary. The imaging signal stored in the memory 1308 is outputted to the TV monitor 1430 or the personal computer 1440 in accordance with predetermined operation.

The digital still camera 1300 having this structure contains the gyro sensor 1.

The respective electronic devices shown herein include the gyro sensor 1 having excellent sensitivity and shock resistance, and therefore can offer preferable reliability.

The electronic device according to the embodiment of the invention is not limited to the personal computer (portable personal computer) shown in FIG. 4, the cellular phone shown in FIG. 5, and the digital still camera shown in FIG. 6, but may be applied to ink jet ejectors (such as ink jet printers), laptop personal computers, televisions, video cameras, video tape recorders, automotive navigation systems, pagers, electronic organizers (including ones provided with communication function), electronic dictionaries, electronic calculators, electronic game machines, word processors, workstations, video phones, surveillance TV monitors, electronic binoculars, POS terminals, medical equipment (such as electronic clinical thermometers, sphygmomanometers, blood glucose meters, electrocardiographs, ultrasonic diagnostic equipment, and electronic endoscopies), fish finders, various types of measuring apparatuses, instruments (such as instruments for vehicles, airplanes, and vessels), flight simulators, and others.

The invention is not limited to the gyro sensor and the electronic device described and depicted in the embodiment herein, but may be practiced otherwise in various manners within the scope of the technical spirit of the invention as specified in the appended claims.

The entire disclosure of Japanese Patent Application No. 2012-084617, filed Apr. 3, 2012 is expressly incorporated by reference herein.

What is claimed is:

1. A gyro sensor, comprising:
   a driving mass driven in a first direction by a driving unit;
   a detection mass connected with the driving mass;
   a driving connection, one end and another end of which are connected with the driving mass and a first anchor, respectively;
   a first island connected with the first anchor, and disposed with a clearance left between the first island and the driving mass in such a manner as to be electrically connected with the driving mass; and
   a projection provided at least either on a surface of the driving mass opposed to the first island, or on a surface of the first island opposed to the driving mass, wherein
the driving unit includes a movable electrode unit connected with the driving mass, and a fixed electrode unit disposed opposed to the movable electrode unit, and
a minimum distance between the driving mass and the first island is longer than a driving amplitude of the driving mass and shorter than a maximum amplitude of the movable electrode unit.

2. The gyro sensor according to claim 1, wherein
the first island has a first distance regulating portion extended to a position facing the driving mass to regulate a distance between the driving mass and the first island; and
the projection is provided at least either on a surface of the driving mass opposed to the first distance regulating portion, or on a surface of the first distance regulating portion opposed to the driving mass.

3. The gyro sensor according to claim 1, wherein
the two driving masses are arranged in the first direction; and
the gyro sensor further includes
an intermediate connection which connects the two driving masses, an intermediate portion of the intermediate connection being fixed via a second anchor,
a second island disposed between the two driving masses and connected with the second anchor, and
projections provided at least either on surfaces of the driving masses opposed to the second island or on surfaces of the second island opposed to the driving masses.

4. The gyro sensor according to claim 3, wherein
the second island has a second distance regulating portion extended to positions facing the respective driving masses to regulate distances between the driving masses and the second island; and
the projections are provided at least either on surfaces of the driving masses opposed to the second distance regulating portion, or on surfaces of the second distance regulating portion opposed to the driving masses.

5. The gyro sensor according to claim 1, wherein at least wherein the first island comprises a pair of first islands that are arranged in a direction crossing the first direction.

6. The gyro sensor according to claim 1, wherein
the detection mass is connected with the driving mass via a detection connection; and
a projection is provided at least either on the detection mass or on the detection connection.

7. The gyro sensor according to claim 1, wherein
the first anchor is fixed to a substrate; and
a projection is provided on the substrate at a position overlapping at least either with the driving mass or with the detection mass in a plan view.

8. An electronic device, comprising the gyro sensor according to claim 1.

* * * * *